(12) United States Patent
Moon et al.

(10) Patent No.: US 7,720,508 B2
(45) Date of Patent: May 18, 2010

(54) RADIO CONTROLLER, SERVER AND MOBILE COMMUNICATION METHOD

(75) Inventors: Sung Uk Moon, Yokohama (JP); Minami Ishii, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 490 days.

(21) Appl. No.: 11/260,408

(22) Filed: Oct. 28, 2005

(65) Prior Publication Data

US 2006/0111106 A1 May 25, 2006

(30) Foreign Application Priority Data

Nov. 2, 2004 (JP) .......................... P2004-319885

(51) Int. Cl.
*H04M 1/00* (2006.01)
(52) U.S. Cl. .................................... 455/560
(58) Field of Classification Search ................. 370/229, 370/335, 431, 464; 455/3.01, 418, 446, 560
See application file for complete search history.

(56) References Cited

U.S. PATENT DOCUMENTS

| | | | |
|---|---|---|---|
| 6,917,807 B1 * | 7/2005 | Vialen et al. ............. | 455/435.2 |
| 7,161,963 B2 * | 1/2007 | Kauschke et al. ........... | 370/503 |
| 7,454,213 B2 * | 11/2008 | Tolli ........................... | 455/453 |
| 2004/0081125 A1 * | 4/2004 | Ranta-Aho et al. .......... | 370/335 |
| 2004/0136349 A1 * | 7/2004 | Walton et al. ............... | 370/338 |
| 2004/0192313 A1 * | 9/2004 | Otting ......................... | 455/446 |
| 2004/0202140 A1 * | 10/2004 | Kim et al. .................... | 370/335 |
| 2005/0079865 A1 * | 4/2005 | Ahn et al. .................... | 455/434 |

FOREIGN PATENT DOCUMENTS

| EP | 1 420 551 A2 | 5/2004 |
|---|---|---|
| EP | 1 467 586 A2 | 10/2004 |

OTHER PUBLICATIONS

"Universal Mobile Telecommunications System (UMTS); Introduction of Multimedia Broadcast/Multicast Service (MBMS) in the Radio Access Network (RAN); Stage 2 (3GPP TS 25.346 version 6.2.0 Release 6)", ETSI TS 125 346 V6.2.0, Technical Specification, XP-014016839, Sep. 2004, pp. 1-52 and cover page.

"3rd Generation Partnership Project; Technical Specification Group Radio Access Network; Introduction of the Multimedia Broadcast Multicast Service (MBMS) in the Radio Access Network (RAN); Stage 2 (Release 6)"; Technical Specification, 3GPP TS 25.346, V6.1.0, Jun. 2004, pp. 1-51.

* cited by examiner

*Primary Examiner*—Lester Kincaid
*Assistant Examiner*—Nathan Mitchell
(74) *Attorney, Agent, or Firm*—Oblon, Spivak, McClelland, Maier & Neustadt, L.L.P.

(57) ABSTRACT

A radio controller includes: a schedule information receiver for receiving schedule information related to a schedule of data transmission; a selection execution determiner for determining, based on the schedule information, whether or not to select a cell used by a mobile station after the data reception; and a selection execution commander for commanding the mobile station to select the cell used after the data reception in accordance with a determination result by the selection execution determiner.

13 Claims, 6 Drawing Sheets

RADIO CONTROLLER, SERVER AND MOBILE COMMUNICATION METHOD

CROSS REFERENCE TO RELATED APPLICATIONS

This application is based upon and claims the benefit of priority from the prior Japanese Patent Applications No. P2004-319885, filed on Nov. 2, 2004; the entire contents of which are incorporated herein by reference.

BACKGROUND OF THE INVENTION

1. Field of the Invention

The present invention relates to a radio controller, a server and a mobile communication method.

2. Description of the Related Art

A service of transmitting multimedia contents to a plurality of mobile stations by broadcast or multicast (Multimedia Broadcast Multicast Service; hereinafter referred to as the "MBMS") has been conventionally performed (for example, 3GPPTSG-RAN, "TS25.346 V6.1.0 Introduction of Multimedia broadcast multicast service (MBMS) in Radio access network (RAN)", June 2004). In the MBMS, a frequency used for transmitting data by the MBMS is notified to mobile stations through the Radio Access Network (RAN). Therefore, mobile stations, which are not currently receiving data by the MBMS, can receive data by the MBMS by performing handover to the notified frequency.

BRIEF SUMMARY OF THE INVENTION

However, mobile stations, which have started using a certain frequency for data transmission by an MBMS, continue to use the frequency even after receiving data by the MBMS, unless the communication quality of the frequency is deteriorated. Accordingly, traffic is concentrated in a certain frequency, thus causing traffic bias between frequencies. Such a problem is not limited to the MBMS. For example, also in the case where a mobile station receives data transmitted using a certain frequency, such as High Speed Downlink Packet Access (HSDPA), similar problems can arise. In this manner, if traffic concentrates in a particular portion, waste arises in use of radio resources.

Hence, when changing frequencies which are used after the mobile station received the data in order to distribute traffic, problems newly arose if the next data transmission is to be started at the frequency before the change. Specifically, if the next data transmission is to be started immediately after the data transmission is finished and the frequency is changed, the mobile station needs to back to the frequency before the change again. The power consumption of the mobile station increases by such a wasteful change of the frequency.

Accordingly, an object of the present invention is to prevent traffic concentration after data transmission, thus utilizing radio resources effectively as well as reducing the power consumption of a mobile station.

A radio controller according to the present invention includes: a schedule information receiver configured to receive schedule information which shows a schedule of data transmission; a selection execution determiner configured to determine, based on the schedule information, whether or not to cause a mobile station to select a cell which is used by the mobile station after data reception; and a selection execution commander configured to command the mobile station to select the cell which is used by the mobile station after the data reception in accordance with a determination result by the selection execution determiner.

According to the radio controller, it is determined whether or not to select the cell used by the mobile station after the data reception in consideration of the schedule information. The radio controller can cause the mobile station to select the cell used after the data reception, only when the selection is necessary as a result of the determination. Therefore, the radio controller can prevent the mobile station from selecting a cell wastefully and whereby changing cells wastefully. Hence, the radio controller can distribute mobile stations into a plurality of cells after the data reception, can prevent traffic concentration, and can utilize radio resources effectively. In addition, the radio controller can reduce the power consumption of a mobile station.

Another radio controller according to the present invention includes: a schedule information receiver configured to receive schedule information which shows a schedule of data transmission; a selection execution determiner configured to determine, based on the schedule information, whether or not to cause a mobile station to select a cell which is used by the mobile station after data reception; a cell selector configured to select the cell in accordance with a determination result by the selection execution determiner; and a mobile station controller configured to control the mobile station in a manner of performing radio communication using the cell selected by the cell selector.

According to the radio controller, it is determined whether or not to select the cell used by the mobile station after the data reception in consideration of the schedule information. The radio controller can select the cell to cause the mobile station to use after the data reception, only when the selection is necessary as a result of the determination. Additionally, the radio controller can cause the mobile station to use the selected cell. Hence, the radio controller can prevent wasteful selection of the cell and can therefore prevent the mobile station from changing the cells wastefully. Accordingly, the radio controller can distribute the mobile stations into a plurality of cells after the data reception, can prevent traffic concentration, and can utilize radio resources effectively. In addition, the radio controller can reduce the power consumption of the mobile station.

A server according to the present invention includes: a schedule information manager configured to determine schedule information which shows a schedule of data transmission; a selection execution determiner configured to determine, based on the schedule information, whether or not to cause a mobile station to select a cell which is used by the mobile station after data reception; and a selection execution commander configured to command a radio controller or the mobile station to select the cell which is used by the mobile station after the data reception in accordance with a determination result by the selection execution determiner.

According to the server, the schedule information is determined, and whether or not the mobile station should select a cell to be used by the mobile station after the data reception is determined in consideration of the schedule information. The server can cause the radio controller or the mobile station to select a cell used by the mobile station after the data reception, only when the server needs to select the cell. Accordingly, the server can prevent the mobile station from changing the cells wastefully, which is caused by that the radio controller or the mobile station executes the cell selection wastefully. Hence, the server can distribute the mobile stations into a plurality of cells after the data reception, can prevent traffic concentration, and can utilize radio resources effectively. In addition, the server can reduce the power consumption of the mobile station.

Especially, when an interval of data transmission is shorter than a threshold value, it is preferable that the selection execution determiner should determine not to execute the cell selection. According to this, the radio controller can prevent the mobile station from changing the cells wastefully if the next data transmission is to be started immediately after the data transmission is finished once. Therefore, the radio controller can reduce the power consumption of the mobile station appropriately.

Moreover, schedule information on data transmission performed by at least one of broadcast, multicast and High Speed Downlink Packet Access can be used as the schedule information. According to this, in a case where it is desired to distribute mobile stations which concentrate in a particular cell, such as a case of broadcast, multicast or High Speed Downlink Packet Access (HSDPA), it is possible to prevent traffic concentration and utilize radio resources effectively. In addition, it is possible to reduce the power consumption of the mobile station.

Furthermore, the schedule information manager can determine schedule information based on the records of the schedule information. For example, if a state of short intervals of data transmission continues, the mobile stations may continue to be in a particular cell. Therefore, the server appropriately distributes the mobile stations into a plurality of cells by determining the schedule information based on the previous schedule information. Consequently, traffic concentration can be prevented.

A mobile communication method according to the present invention includes the steps of: receiving schedule information which shows a schedule of data transmission; determining, based on the schedule information, whether or not to cause a mobile station to select a cell which is used by the mobile station after the data reception; and commanding the mobile station to select the cell which is used by the mobile station after the data reception in accordance with a determination result in the determining step.

Another mobile communication method according to the present invention includes the steps of: receiving schedule information which shows a schedule of data transmission; determining, based on the schedule information, whether or not to cause a mobile station to select a cell which is used by the mobile station after the data reception; selecting the cell in accordance with a determination result in the determining step; and controlling the mobile station in a manner of performing radio communication using the selected cell.

Still another mobile communication method according to the present invention includes the steps of: determining schedule information which shows a schedule of data transmission; determining, based on the schedule information, whether or not to select a cell which is used by a mobile station after data reception; commanding a radio controller or the mobile station to select the cell which is used by the mobile station after data reception in accordance with a determination result in the determining step.

As described above, according to the features of the present invention, it is possible to prevent traffic concentration after data reception, thus utilizing radio resources effectively as well as reducing the power consumption of a mobile station.

DESCRIPTION OF THE PREFERRED EMBODIMENTS

First Embodiment (Mobile Communication System)

Figure 1:
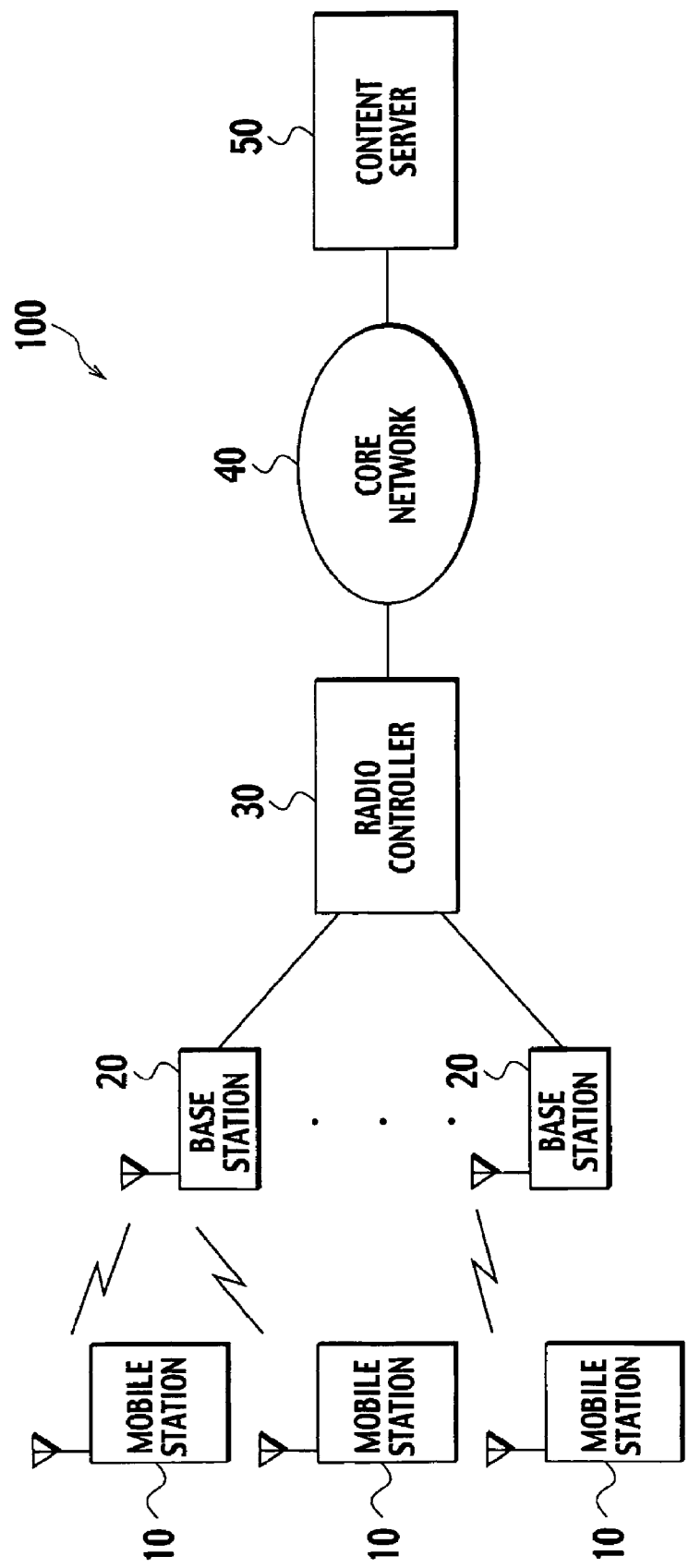
FIG. 1 is a view showing a configuration of a mobile communication system according to a first embodiment of the present invention.

As shown in FIG. 1, a mobile communication system 100 includes mobile stations 10, base stations 20, a radio controller 30, a core network 40, and a content server 50.

The content server 50 carries out Multimedia Broadcast Multicast Service (MBMS), in which multimedia contents and the like are transmitted to the plurality of mobile stations 10 by broadcast or multicast, and the like. The content server 50 transmits multimedia contents and the like to the plurality of mobile stations 10 through the core network 40, the radio controller 30 and the base station 20 by broadcast or multicast.

The radio controller 30 controls radio communication between the base station 20 and the mobile station 10. The base station 20 and the mobile station 10 perform radio communication in accordance with the control by the radio controller 30. The mobile station 10 transmits and receives data and control signals to and from the radio controller 30 and the content server 50 through the base station 20.

The mobile communication system 100 covers a plurality of areas. Each area is divided into a plurality of cells by the positions and the frequencies. In the mobile communication system 100, one area is divided by a plurality of frequencies, and has a layer structure formed by the plurality of frequencies. The area divided for each frequency is further divided by the positions, and thus constituting a plurality of cells. In this manner, the cell is a communication region divided by the frequencies and the positions.

In the mobile communication system 100 carrying out the MBMS, frequency layer convergence processing (FLC processing) is performed. The FLC processing means processing in which a frequency to be used for transmitting data by the MBMS (hereinafter referred to as the "target frequency") is notified to the mobile station 10 and the mobile station 10 is caused to receive the data by the MBMS using the target frequency. The FLC processing is performed by that the radio controller 30 transmits a control signal to the mobile station 10 through the base station 20. Specifically, the radio controller 30 notifies the mobile station 10 of the target frequency by transmitting to the mobile station 10 a control signal called the Layer Convergence Information (LCI). The LCI includes an offset value between the target frequency and the frequency which is currently being used by the mobile station 10 (hereinafter referred to as the "in-use frequency").

Figure 2:
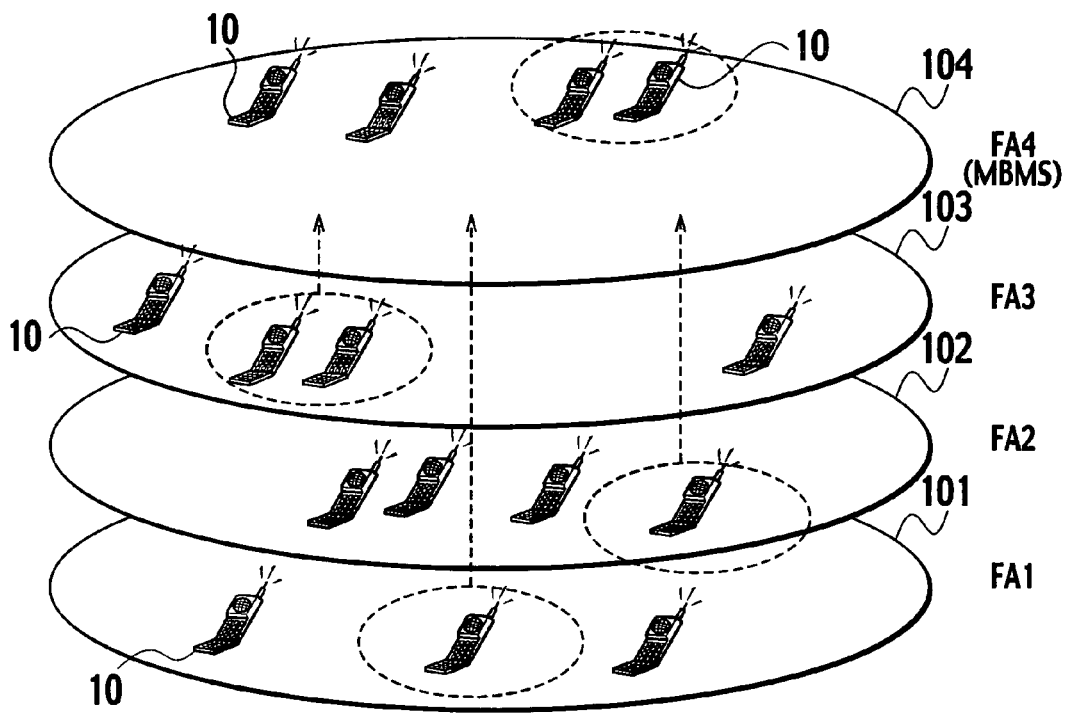
FIG. 2 is a view showing a state before frequency handover according to the first embodiment of the present invention.
Figure 3:
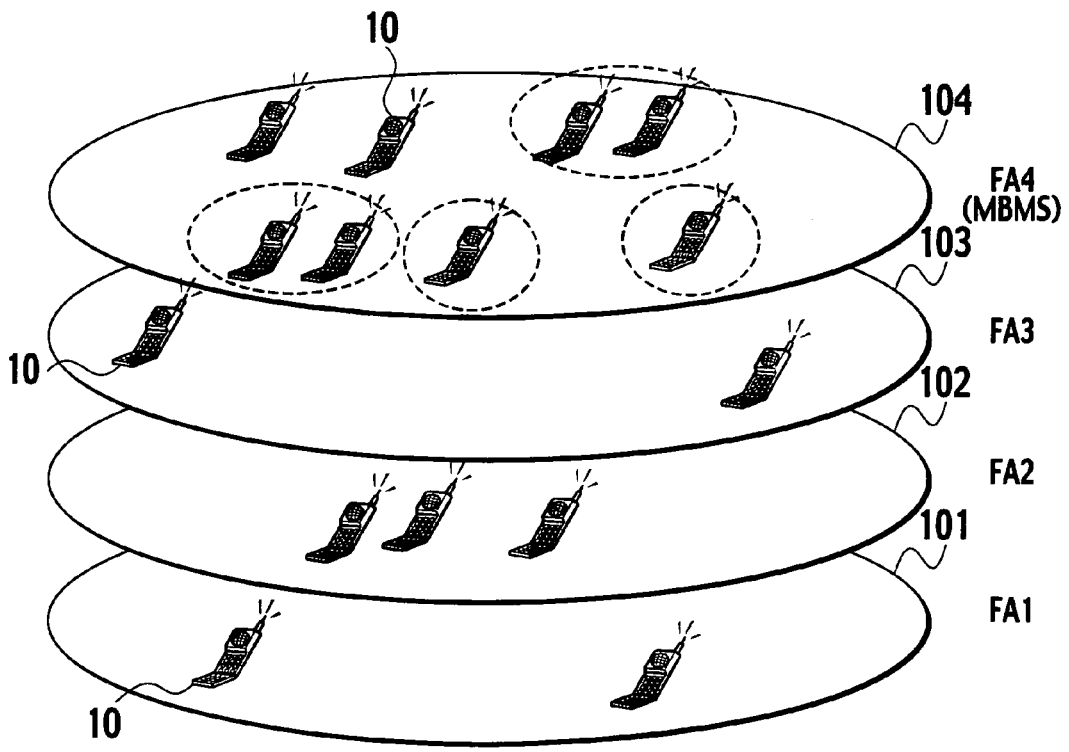
FIG. 3 is a view showing a state after the frequency handover according to the first embodiment of the present invention.

A detailed description will be given of the FLC processing with reference to FIGS. 2 and 3. FIGS. 2 and 3 show cells 101 to 104 divided by four frequencies, FA 1 to FA 4. The illustration is omitted, but a plurality of cells whose positions differ exist for each of the frequencies FA 1 to FA 4.

As shown in FIG. 2, the mobile stations 10 visit in the cells 101 to 104 of the frequencies FA 1 to FA 4, before data transmission by the MBMS. When data is transmitted by the MBMS using the frequency FA 4, the radio controller 30 notifies the mobile stations 10 of the target frequency FA 4 through the base station 20. The radio controller 30 notifies the target frequency FA 4 by an MBMS Control Channel (MCCH) through the base station 20 at the frequencies FA 1 to FA 4. The MCCH is a broadcast channel for transmitting a control signal related to the MBMS. For example, the LCI including an offset value between the target frequency FA 4 and the in-use frequency FA 3 is transmitted to the mobile stations 10 visiting in the cell 103. Thus, the target frequency is notified to the mobile stations 10.

The mobile stations 10 desiring to receive data by the MBMS (the mobile stations encircled with a dashed line in FIG. 2) receive the LCI transmitted by the MCCH. Then, the mobile stations 10 perform frequency handover to the target frequency FA 4. In other words, the mobile stations 10 connect to the base station 20 which covers the cell 104 of the frequency FA 4, thus starting radio communication using the frequency FA 4. As a result of the frequency handover, as shown in FIG. 3, the mobile stations 10 desiring the data reception by the MBMS move to the cell 104 of the frequency FA 4. Subsequently, the mobile stations 10 receive the data offered by the MBMS using the frequency FA 4.

(Radio Controller)

Figure 4:
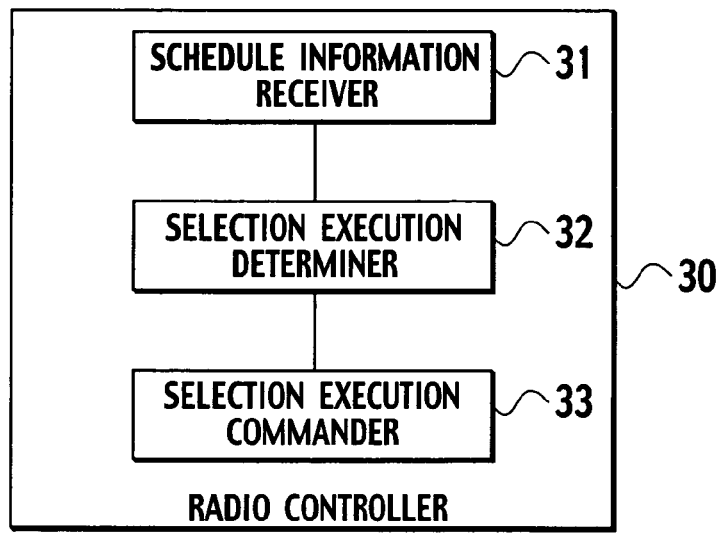
FIG. 4 is a block diagram showing a configuration of a radio controller according to the first embodiment of the present invention.

Next, a more detailed description will be given of the radio controller 30. As shown in FIG. 4, the radio controller 30 includes a schedule information receiver 31, a selection execution determiner 32 and a selection execution commander 33.

The schedule information receiver 31 receives schedule information related to a schedule of data transmission. The schedule information includes the time of data transmission (hereinafter referred to as the "transmission time"), an interval of data transmission (hereinafter referred to as the "transmission interval") and a period of data transmission (hereinafter referred to as the "transmission period"). The transmission time includes the start time of data transmission and the end time of data transmission.

For example, the schedule information includes information deciding the start and end times of data transmission performed by the content server 50, such as "session 1: 12(hr):00(min):00(sec) to 12:01:00" and "session 2: 12:01: 01 to 12:02:00". Furthermore, the schedule information includes information on a transmission interval of data transmission performed by the content server 50, such as "an interval between the sessions 1 and 2: 3 seconds". Moreover, the schedule information includes information deciding the start time and transmission period of data transmission performed by the content server 50, such as "session 1: one minute from 12:00:00" and "session 2: one minute from 12:01:01".

For example, the schedule information includes schedule information of data transmission performed by at least one of broadcast, multicast and High Speed Downlink Packet Access.

The schedule information receiver 31 can receive the schedule information from the content server 50 through the core network 40. Otherwise, the core network 40 can be provided with a management server for managing the schedule information. In this case, the schedule information receiver 31 can receive the schedule information from the management server provided in the core network 40. The schedule information receiver 31 inputs the received schedule information in the selection execution determiner 32.

The selection execution determiner 32 determines, based on the schedule information, whether or not to select a cell to be used by the mobile station 10 after data reception. For example, the selection execution determiner 32 can determine not to execute the cell selection based on the schedule information, when the time until the next data transmission after the data reception is short. On the other hand, the selection execution determiner 32 determines to execute the cell selection, when the time until the next data transmission is long enough.

For example, the selection execution determiner 32 can determine not to execute the cell selection, when an interval of data transmission is shorter than a threshold value. In this case, the selection execution determiner 32 itself may set a threshold value, or a threshold value received together with the schedule information by the schedule information receiver 31 may be used.

Even if a new cell is selected, there arises no need to immediately return to the cell before the change. Therefore, it is possible to set a transmission interval, with which the cell selection does not become wasteful, as a threshold value. Hence, when the transmission interval is shorter than the threshold value, there arises a need to return to the cell before the change immediately after the cell selection, thus making the cell selection wasteful. On the other hand, if the transmission interval is longer than the threshold value, the cell selection does not become wasteful.

The selection execution determiner 32 compares the received schedule information and the threshold value. When receiving the transmission interval as the schedule information, the selection execution determiner 32 compares the received transmission interval and the threshold value. When receiving a transmission time and a transmission period as the schedule information, the selection execution determiner 32 first calculates the transmission interval using the transmission time and the transmission period. Subsequently, the selection execution determiner 32 compares the calculated transmission interval and the threshold value.

For example, when the threshold value is set at two seconds, the selection execution determiner 32 compares the received transmission interval between the sessions 1 and 2 with the threshold value of two seconds. The selection execution determiner 32 determines not to execute the cell selection, when the received transmission interval is one second and is shorter than the threshold value of two seconds. On the other hand, the selection execution determiner 32 determines to execute the cell selection, when the received transmission interval is three seconds and is equal to or longer than the threshold value of two seconds.

Moreover, the selection execution determiner 32 finds the difference between the transmission end time of "12:01:00" of the above-mentioned transmission time in session 1 of "from 12:00:00 to 12:01:00" and the transmission start time of "12:01:01" of the transmission time in session 2 of "from 12:01:01 to 12:02:00". Thus, the transmission interval of "one second" is calculated.

Otherwise, the selection execution determiner 32 adds the transmission period of "one minute" to the above-mentioned transmission start time in session 1 of "12:00:00". Then, the transmission end time is found. The selection execution determiner 32 finds the difference between the found transmission end time and the transmission start time in session 2 of "12:01:01". Thus, the transmission interval of "one second" is calculated.

The selection execution determiner 32 compares the calculated transmission interval of one second and the threshold value of two seconds. Since the transmission interval is shorter than the threshold value, the selection execution determiner 32 determines not to execute the cell selection. On the other hand, when the calculated transmission interval is three seconds and is equal to or longer than the threshold value of two seconds, the selection execution determiner 32 determines to execute the cell selection.

Additionally, after the cell selection based on the schedule information is determined, the selection execution determiner 32 may further determine whether or not to execute the cell selection based on at least one of a usage state of radio resources in the cell, the number of mobile stations visiting the cell, the cell use records of the mobile stations 10, the state of a propagation path in the cell, and communication quality in the cell.

The cell use record includes a visiting time, a visiting frequency, the order of cell use, data transmission and reception times and a visiting time, in the cell where the mobile station 10 has so far transmitted and received data and is currently transmitting and receiving data, and the cell where the mobile station 10 has so far been on standby and is currently being on standby, for example.

For example, the selection execution determiner 32 can determine not to execute the cell selection, when the radio resources are already used evenly or when the mobile stations 10 are distributed equally. On the other hand, the selection execution determiner 32 determines to execute the cell selection, when the usage states of the radio resources are unequal, or when the mobile stations 10 are visiting in a particular point. As described above, the radio controller 30 can prevent the cell selection from being executed wastefully in a case where there is no need to select a new cell used by the mobile station 10 after the data reception, such as when the radio resources are already used evenly, or when the mobile stations 10 are distributed equally.

Further, the selection execution determiner 32 can determine not to execute the cell selection regarding, for example, the mobile station which does not change visiting cells comparing before and during data reception, the mobile station visiting a cell whose visiting time and visiting frequency are long and high, and the mobile station visiting a cell whose state of a propagation path and communication quality are excellent. On the other hand, the selection execution determiner 32 can determine to execute the cell selection regarding the mobile station which has changed visiting cells comparing before and during data reception, the mobile station visiting a cell whose visiting time and visiting frequency are short and low, and the mobile station visiting a cell whose state of a propagation path and communication quality are deteriorated. According to this, the radio controller 30 does not cause all the mobile stations 10 to execute the cell selection, but prevents the mobile stations which do not need to select new cells used after data reception from executing the cell selection, and causes only the mobile stations need the cell selection to execute it.

In this manner, the selection execution determiner 32 may determine whether or not to execute the selection based on the state of the whole mobile communication system 100. Otherwise, the selection execution determiner 32 may determine whether or not to execute the selection for each mobile station 10 based on the state of each mobile station 10.

The selection execution determiner 32 can request the base station 20 to notify the cell use record of the mobile station 10, the usage state of the radio resources in the cell, the number of mobile stations visiting the cell, the state of the propagation path in the cell, the communication quality of the cell, or the like.

It is preferable that the selection execution determiner 32 should determine whether or not to select a cell used by the mobile station 10, at least one of after receiving the data transmitted by broadcast, after receiving the data transmitted by multicast, and after receiving the data transmitted by High Speed Downlink Packet Access.

According to this, the radio controller 30 can prevent traffic concentration efficiently, and can utilize the radio resources effectively, in a case of receiving the data transmitted using a particular frequency or the data transmitted to the mobile station 10 existing in a particular position, such as data transmitted by broadcast transmission, multicast transmission or High Speed Downlink Packet Access (HSDPA), and desiring to distribute the mobile stations concentrated in a particular cell or position into cells whose frequencies and positions differ. The selection execution determiner 32 inputs the determination result into the selection execution commander 33.

The selection execution commander 33 commands the mobile station 10 to select a cell used after data reception. The selection execution commander 33 obtains the determination result from the selection execution determiner 32. The selection execution commander 33 commands the mobile station 10 to select, when the determination result indicates to execute the selection. On the other hand, the selection execution commander 33 does not command the mobile station 10 to select, when the determination result indicates not to execute the selection.

The selection execution commander 33 creates a control signal including a selection command which commands the mobile station 10 to select a cell, and transmits the control signal to the mobile station 10. The selection execution commander 33 creates the control signal including the selection command, which is, for example, a control signal to be transmitted using a radio channel such as a dedicated channel which is dedicated to each of the mobile stations 10, a common channel which is common to the plurality of mobile stations 10 and a broadcast channel.

Figure 5A:
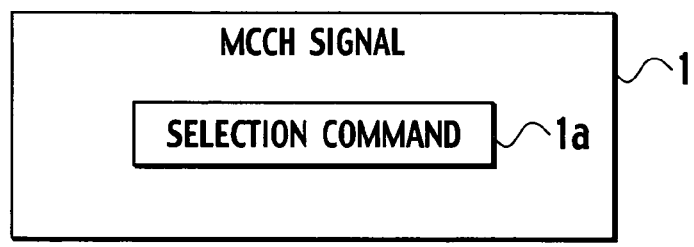
FIGS. 5A and 5B are views showing MCCH and BCCH signals according to the first embodiment of the present invention.
Figure 5B:
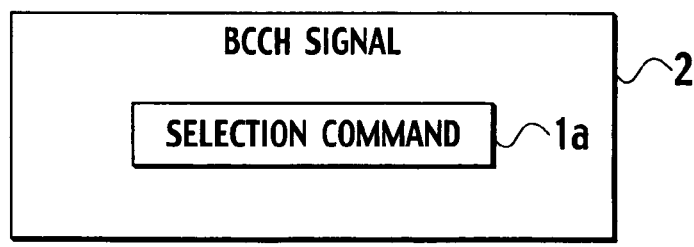

The selection execution commander 33 can create an MCCH signal 1 including a selection command 1a as shown in FIG. 5A, for example. The MCCH signal 1 is a control signal related to the MBMS which is transmitted by THE MCCH. Moreover, the selection execution commander 33 may create a BCCH signal 2 including the selection command 1a as shown in FIG. 5B. The BCCH signal 2 is a control signal which is transmitted using a control channel called a Broadcast Control Channel (BCCH). Otherwise, the selection execution commander 33 may create a control signal including a selection command transmitted using a control channel in HSDPA.

The selection execution commander 33 maps the created control signal to an appropriate radio channel, and transmits it to the mobile station 10. The selection execution commander 33 transmits the control signal including the selection command to the mobile station 10 at any timing of while on standby before data reception, during data reception and after data reception, thus commanding the mobile station 10 to select. In this manner, the selection execution commander 33 can easily command the mobile station 10 to select a cell, by transmitting the control signal including the selection command to the mobile station 10.

The mobile station 10 selects a cell in accordance with the command by the radio controller 30. For example, as shown in FIG. 3, the mobile station 10 receives data offered by the MBMS in the cell 104 using the frequency FA 4. The mobile station 10 performs frequency handover to the frequency FA 3, when selecting, for example, the cell 103 as a cell used after data reception by the MBMS. In other words, the mobile station 10 connects to the base station 20 covering the cell 103 of the frequency FA 3, thus starting radio communication using the frequency FA 3. For example, after the data reception, the mobile station 10 enters a standby mode or starts transmitting and receiving new data using the selected cell.

Figure 6:
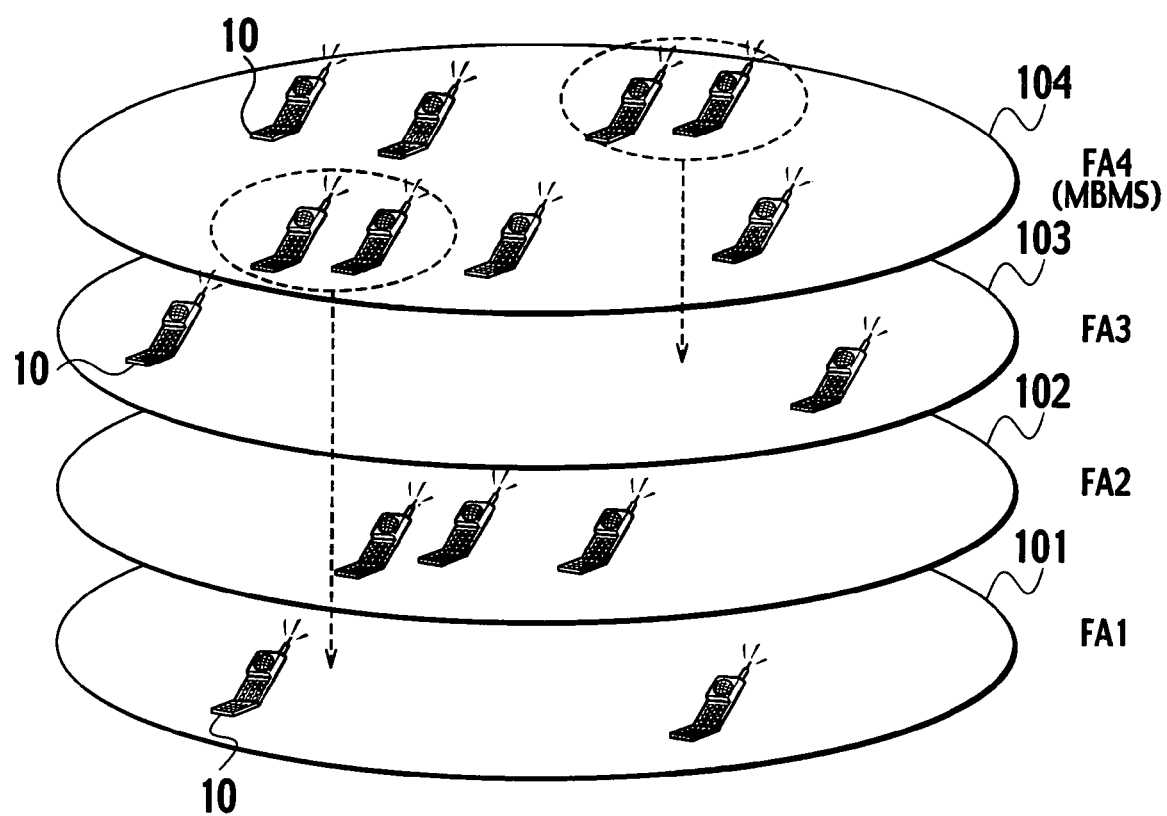
FIG. 6 is a view showing a state after data reception according to the first embodiment of the present invention.

Accordingly, it is possible to distribute the mobile stations 10 by causing multiple mobile stations 10 (the mobile stations encircled with a dashed line in FIG. 6) to use the cells 101 or 103 changing from the cell 104. As shown in FIG. 6, the mobile station 10 can select a cell used by the mobile station 10 after the data reception in a manner of dispersing the mobile stations 10 to each cell without concentrating traffic in one cell.

(Mobile Communication Method)

Figure 7:
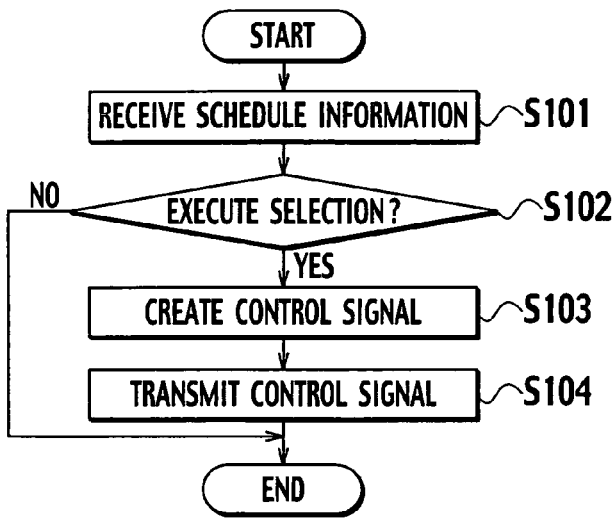
FIG. 7 is a flowchart showing the procedures of a mobile communication method according to the first embodiment of the present invention.

Next, a mobile communication method using the mobile communication system 100 will be described. FIG. 7 shows the operational procedures of the radio controller 30. In Step S101, the radio controller 30 receives the schedule information of data transmission, for example, from the content server 50. In Step 102, the radio controller 30 determines, based on the received schedule information, whether or not to select a cell used by the mobile station 10 after data reception. Then, in Step S103, the radio controller 30 creates a control signal including a selection command, when it is determined to execute the selection. In Step S104, the radio controller 30 transmits the created control signal to the mobile station 10 through the base station 20. On the other hand, when it is determined not to execute the selection in Step S102, the radio controller 30 does not create the control signal including the selection command, and terminates the process.

(Effects)

According to the mobile communication system 100, the radio controller 30 and the mobile communication method, the radio controller 30 determines whether or not to select a cell used by the mobile station 10 after the data reception in consideration of the schedule information. It is possible to cause the mobile station 10 to select the cell used after the data reception only when the selection should be executed. Therefore, the radio controller 30 can prevent the mobile station 10 from executing the cell selection wastefully and whereby changing the cells wastefully.

Hence, the radio controller 30 can distribute the mobile stations 10 to the plurality of cells after the data reception, can prevent traffic concentration, and can utilize the radio resources effectively. When the mobile station 10 receives data transmitted using a particular frequency and data transmitted to the mobile station existing in a particular position, for example, when receiving data by the MBMS or HSDPA, it is possible to distribute the mobile stations 10 concentrating at the particular frequency and in the particular position into the cells whose frequencies and positions differ as equally and efficiently as possible after the data reception.

In addition, the radio controller 30 can reduce the power consumption of the mobile station 10. In other words, it is possible to prevent traffic concentration by causing the mobile station 10 to select a cell used after the data reception. However, there is a potential start of the next data transmission immediately after the mobile station 10 completes the data transmission (for example, an MBMS session and the like) once, then selects a new cell and enters a standby mode in the selected cell, when the transmission interval of data transmission is short. In this case, the mobile station 10 needs to return to the cell (the frequency) before the selection, which leads to an increase in the number of wasteful cell selections and of changes of cells. Consequently, an increase for consumption of the mobile station 10 is invited. However, with the radio controller 30, it is possible to reduce the power consumption of the mobile station, since it is possible to determine whether or not to select a cell after the reception in consideration of the schedule information.

Further, the radio controller 30 can obtain an effect that prevents the cell selection from being executed when there is a potential affection to the reception of data which is transmitted next due to the selection of a new cell.

Second Embodiment (Content Server)

Figure 8:
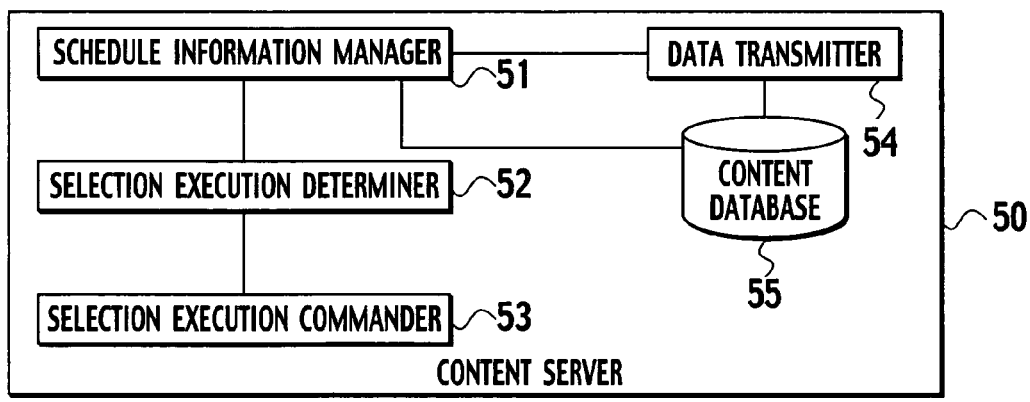
FIG. 8 is a block diagram showing a configuration of a content server according to a second embodiment of the present invention.

In this embodiment, a content server 50 shown in FIG. 8 is used in the mobile communication system 100 shown in FIG. 1. As shown in FIG. 8, the content server 50 includes a schedule information manager 51, a selection execution determiner 52, a selection execution commander 53, a data transmitter 54 and a content database 55.

The content database 55 stores data (contents) to be transmitted by the content server 50. The data transmitter 54 obtains the data (the contents) from the content database 55, and transmits the data to a mobile station 10 through a core network 40, a radio controller 30 and a base station 20. The data transmitter 54 transmits the data to the mobile station 10 by broadcast, multicast, High Speed Downlink Packet Access, or the like in accordance with the control of the schedule information manager 51.

The schedule information manger 51 determines schedule information related to a schedule of data transmission. The schedule information manager 51 determines the schedule information of the data transmission performed by at least one of broadcast, multicast and High Speed Downlink Packet Access, for example.

The schedule information manager 51 can determine the schedule information based on the records of the schedule information, the contents of the transmission data, the processing performance and load of the data transmitter 54, and the like.

For example, when the state of short transmission intervals continues, the mobile station potentially stays in a particular cell. For this reason, the schedule information manager 51 determines the schedule information in a manner of making the transmission intervals long based on the transmission intervals so far, after the short transmission intervals continued for a predetermined period or number of times. In this manner, the content server 50 can prevent traffic concentration by appropriately dispersing the mobile stations to a plurality of cells, if the schedule information is determined based on the previous schedule information. The schedule information manager 51 can store the determined schedule information as a record, thus using the record to determine the schedule information.

The schedule information manager 51 obtains the information related to the transmitted data from the content database 55. The schedule information manager 51 detects the processing performance and load of the data transmitter 54.

The schedule information manager 51 determines, for each data, the transmission times such as the start and end times of the data transmission, the transmission interval and the transmission period, which are described above.

The schedule information manager 51 inputs the determined schedule information into the selection execution determiner 52. The schedule information manager 51 controls the data transmitter 54 to transmit data in accordance with the determined schedule information. Additionally, the schedule information manager 51 may command the data transmitter 54 to transmit the determined schedule information to the radio controller 30 and the mobile station 10. In this case, the data transmitter 54 can transmit the schedule information to the radio controller 30 and the mobile station 10 through the core network 40.

Otherwise, when a management server for managing the schedule information is provided in the core network 40, the schedule information manager 51 may command the data transmitter 54 to transmit the determined schedule information to the management server. In this case, the data transmitter 54 transmits the schedule information to the management server.

The selection execution determiner 52 obtains the schedule information from the schedule information manager 51. The selection execution determiner 52 determines, based on the schedule information, whether or not to select a cell used by the mobile station 10 after the data reception. The selection execution determiner 52 can determine whether or not to execute the cell selection as the selection execution determiner 32 shown in FIG. 4 can. The selection execution determiner 52 inputs the determination result into the selection execution commander 53.

The selection execution commander 53 commands the radio controller 30 or the mobile station 10 to select a cell used after the data reception in accordance with the determination result by the selection execution determiner 52. The selection execution commander 53 obtains the determination result from the selection execution determiner 52. The selection execution commander 53 commands the radio controller 30 or the mobile station 10 to select, when the determination result indicates to execute the selection. On the other hand, the selection execution commander 53 does not command the radio controller 30 or the mobile station 10 to select, when the determination result indicates not to execute the selection.

The selection execution commander 53 creates a control signal including a selection command to command the radio controller 30 or the mobile station 10 to select a cell, thus transmitting it to the radio controller 30 or the mobile station 10. The selection execution commander 53 transmits the control signal to the radio controller 30 through the core network 40. Furthermore, the selection execution commander 53 transmits the control signal to the mobile station 10 through the core network 40, the radio controller 30 and the base station 20.

The selection execution commander 53 transmits the control signal including the selection command at any timing of while the mobile station 10 being on standby before the data reception, during the data reception and after the data reception. Therefore, it is possible to command the radio controller 30 or the mobile station 10 to select.

The radio controller 30 transfers the control signal to the mobile station 10, when receiving the control signal including the selection command to the mobile station 10. Subsequently, the mobile station 10 selects a cell in accordance with the command of the content server 50. The radio controller 30 selects a cell in accordance with the command of the content server 50, when receiving the control signal including the selection command to the radio controller itself. The radio controller 30 notifies the mobile station 10 of the selected cell.

(Mobile Communication Method)

Figure 9:
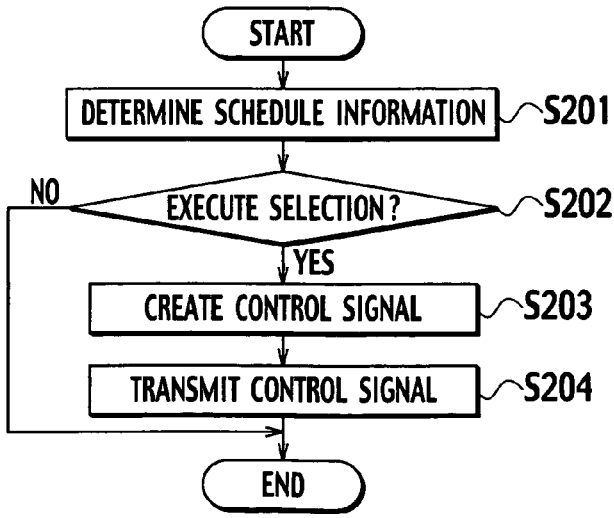
FIG. 9 is a flowchart showing the procedures of a mobile communication method according to the second embodiment of the present invention.

Next, a mobile communication method using the content server 50 shown in FIG. 8 will be described. FIG. 9 shows the operational procedures of the content server 50. In Step S201, the content server 50 determines the schedule information of the data transmission. In Step S202, the content server 50 determines, based on the schedule information, whether or not to select a cell used by the mobile station 10 after the data reception.

In Step S203, the content server 50 creates the control signal including the selection command, when it is determined to execute the selection. In Step S204, the content server 50 transmits the created control signal to the radio controller 30 or the mobile station 10. On the other hand, when it is determined not to execute the selection in Step S202, the content server 50 terminates the process without creating the control signal including the selection command.

(Effects)

According to the content server 50, and the mobile communication system 100 and the mobile communication method using the content server 50, the content server 50 determines the schedule information. Thus, it is possible to determine whether or not to select a cell used by the mobile station 10 after the data reception in consideration of the determined schedule information. Then, the content server 50 can cause the radio controller 30 or the mobile station 10 to select a cell used by the mobile station 10 after the data reception, when the selection should be executed. Hence, the content server 50 can prevent the radio controller 30 and the mobile station 10 from executing the cell selection wastefully, and can therefore prevent the mobile station 10 from changing the cells wastefully. Accordingly, the content server 50 can distribute the mobile stations 10 into the plurality of cells after the data reception, can prevent traffic concentration, and can utilize the radio resources effectively.

Moreover, the content server 50 can reduce the power consumption of the mobile station 10. In addition, it is possible to obtain an effect that the content server 50 can prevent the cell selection from being executed, when there is a potential affection to the reception of data which is transmitted next due to the selection of a new cell.

Third Embodiment (Radio Controller)

Figure 10:
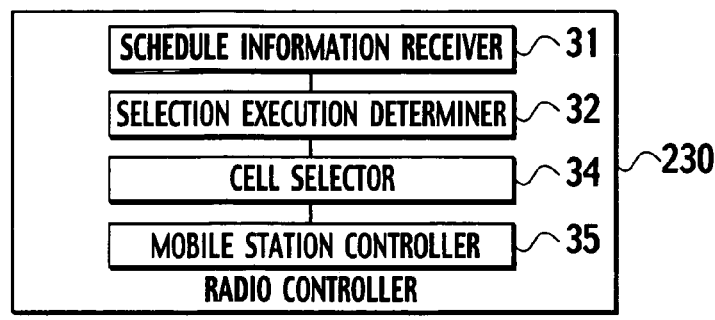
FIG. 10 is a block diagram showing a configuration of a radio controller according to a third embodiment of the present invention.

In this embodiment, a radio controller 230 shown in FIG. 10 is used in the mobile communication system 100 shown in FIG. 1. As shown in FIG. 10, the radio controller 230 includes: a schedule information receiver 31, a selection execution determiner 32, a cell selector 34 and a mobile station controller 35. With regard to substantially the same configuration as that of the radio controller 30 shown in FIG. 4, the description will be omitted here while allocating the same reference numerals.

The selection execution determiner 32 inputs the determination result into the cell selector 34. The cell selector 34 selects a cell used after the data reception in accordance with the determination result by the selection execution determiner 32. The cell selector 34 obtains the determination result from the selection execution determiner 32. The cell selector 34 executes the cell selection, when the determination result indicates to execute the selection. On the other hand, the cell selector 34 does not execute the cell selection, when the determination result indicates not to execute the selection.

It is preferable that the cell selector 34 should select a cell used by the mobile station 10 at least one of after receiving data transmitted by broadcast, after receiving data transmitted by multicast, and after receiving data transmitted by High Speed Downlink Packet Access. According to this, the radio controller 230 can receive data transmitted using a particular frequency and data transmitted to the mobile stations existing in a particular position, which are similar to data transmission such as broadcast transmission, multicast transmission and High Speed Downlink Packet Access (HSDPA). Then, the radio controller 230 can distribute the mobile stations concentrating at the particular frequency and in the particular position to the cells whose frequencies and positions differ.

The cell selector 34 selects a cell used by the mobile station 10 after the data reception from a plurality of cells. For example, the cell selector 34 can select a cell from a neighboring cell using the same frequency as that of a cell which is currently being used by the mobile station 10, a cell with a different frequency and in the same position, a neighboring cell using a different frequency, and the like.

The cell selector 34 can select a cell after the data reception, for example, based on at least one of a cell use record of the mobile station 10, a usage state of radio resources in the cell, the number of mobile stations visiting the cell, the state of a propagation path in the cell, the information related to the cell neighboring to the cell used by the mobile station 10 upon data reception (hereinafter referred to as "the neighboring cell information"), and the communication quality in the cell. According to this, the radio controller 230 can distribute the mobile stations 10 more appropriately in consideration of these pieces of information, thus utilizing the radio resources effectively. The cell selector 34 can select a cell randomly. According to this, the radio controller 230 can reduce control load.

It is preferable that the cell selector 34 should select a cell which the mobile station 10 visited and used just before the data reception as a cell to be used after the data reception when a cell is selected based on the cell use record. According to this, the radio controller 230 can return the mobile station 10 to the cell which was used just before the data reception. Moreover, the cell selector 34 can also select a cell with a long visiting time or a high visiting frequency.

The cell selector 34 can request a base station 20 to notify the cell use record by the mobile station 10, the usage state of the radio resources in the cell, the number of mobile stations visiting the cell, the state of the propagation path in the cell, the communication quality in the cell, or the like. In addition, the cell selector 34 can determine a cell used by the mobile station 10 upon the data reception based on the cell use record of the mobile station 10, thus making it possible to obtain the neighboring cell information.

The cell selector 34 may select one cell or a plurality of cells as candidates. The cell selector 34 may set the order of priority for the use when selecting the plurality of cells. For example, the cell selector 34 can set the order of priority based on at least one of the cell use record of the mobile station 10, the usage state of the radio resources in the cell, the number of mobile stations visiting the cell, the state of the propagation path in the cell, the neighboring cell information, and the communication quality in the cell.

Further, the cell selector 34 may set the order of priority randomly. For example, the cell selector 34 determines the first selection candidate randomly from cells with frequencies usable for the mobile station 10. Subsequently, the highest priority can be set for the cell. The cell selector 34 randomly determines the second candidate and thereafter likewise, thus making it possible to sequentially set the order of priority for the cell.

Additionally, the cell selector 34 may set the order of priority using a value calculated with expression (1) shown below based on an identifier specific to the mobile station 10.

$$(\text{Identifier of mobile station}) \bmod N \qquad (1)$$

Here, N=the number of usable cells by the mobile station

As the identifier specific to the mobile station 10, it is possible to use the International Mobile Subscriber Identity (IMSI) and the like, for example. The cell selector 34 stores a corresponding table of the calculated value of expression (1) with an identifier for identifying a cell (a cell ID) in advance. Then, the cell selector 34 calculates the value using expression (1), thus selecting a cell of a cell ID corresponding to the value calculated based on the corresponding table.

Moreover, the cell selector 34 can select a cell used after the data reception for the plurality of mobile stations 10, and can set a rate of mobile stations which should use the cell (hereinafter referred to as the "rate of mobile stations") for the selected cell. For example, the cell selector 34 can set the rate of mobile stations of a cell 101 at 40%, the rate of mobile stations of a cell 102 at 20%, the rate of mobile stations of a cell 103 at 30%, and the rate of mobile stations of a cell 104 at 10%. The cell selector 34 can increase the rate of mobile stations in a cell which is desired to be used by many mobile stations, such as, for example, a cell having a large space in the radio resources, a cell whose visiting mobile stations are small in number, a cell whose state of a propagation path is excellent, a cell whose communication quality is excellent. On the other hand, the cell selector 34 can decrease the rate of mobile stations in a cell which is in a state where only a small number of mobile stations can use, such as, for example, a cell having a small space in the radio resources, a cell whose visiting mobile stations are large in number, a cell whose state of propagation path or communication quality is deteriorated.

According to this, the radio controller 230 can cause a cell, which is desired to be used by many mobile stations, to be used by many mobile stations, and can reduce the number of mobile stations using a cell which only a small number of mobile stations can use. Therefore, the radio controller 230 can distribute the mobile stations 10 appropriately.

The cell selector 34 may select a cell for each mobile station 10, may select a common cell in each group of particular mobile stations, or may select a cell common to all mobile stations which have received data transmitted by the MBMS or data transmitted by HSDPA.

The cell selector 34 inputs the information on the selected cell (hereinafter referred to as the "selected cell information") into the mobile station controller 35. As the selected cell information, for example, the identifier for identifying a cell (the cell ID), the identifier of a base station covering the cell (a base station ID), control information for receiving a signal in the cell, the frequency of the cell, information on the position of the cell, and the like can be used. These pieces of information may be individually used, or may be used in combination. The absolute value of the frequency of the selected cell (2.0 GHz and the like) or the relative value of the frequency of the selected cell (an offset value between the frequency of the selected cell and the in-use frequency, and the like) can be used as the frequency of the cell, for example. Further, it is possible to include the order of priority, the rate of mobile stations and the like in the selected cell information.

The mobile station controller 35 controls the mobile station 10 to perform radio communication using the cell selected by the cell selector 34 after the data reception. The mobile station controller 35 creates a control signal for notifying the mobile station 10 of the selected cell, thus transmitting it to the mobile station 10. In this manner, the mobile station controller 35 notifies the mobile station 10 of the selected cell, thus controlling the mobile station 10.

The mobile station controller 35 creates the control signal using the selected cell information obtained from the cell selector 34. The mobile station controller 35 creates the control signal including the selected cell information, which is a control signal to be transmitted along a radio channel such as, for example, a dedicated channel dedicated to each mobile station 10, a common channel common to the plurality of mobile stations 10, and a broadcast channel.

Figure 11A:
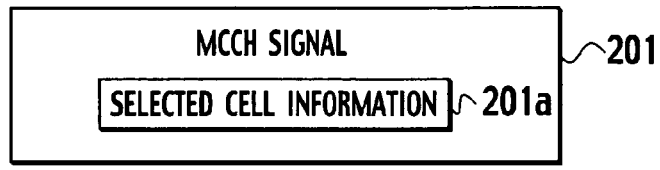
FIGS. 11A and 11B are views showing MCCH and BCCH signals according to the third embodiment of the present invention.
Figure 11B:
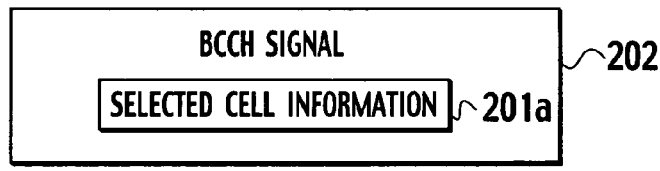

The mobile station controller 35 can create an MCCH signal 201 including selected cell information 201a as shown in FIG. 11A, for example. In addition, the mobile station controller 35 may create a BCCH signal 202 including selected cell information 201a as shown in FIG. 11B. Otherwise, the mobile station controller 35 may create the control signal including the selected cell information transmitted using a control channel in HSDPA.

The mobile station controller 35 maps the created control signal to an appropriate radio channel, and transmits it to the mobile station 10. The mobile station controller 35 transmits the control signal including the selected cell information to the mobile station 10 at any timing of while on standby before the data reception, during the data reception and after the data reception, thus notifying the mobile station 10 of the selected cell information. In this manner, the mobile station controller 35 transmits to the mobile station 10 the control signal including the selected cell information related to the cell to be used after the data reception. Thus, the mobile station controller 35 can easily control the mobile station 10 in a manner of using the cell selected after the data reception.

(Mobile Communication Method)

Figure 12:
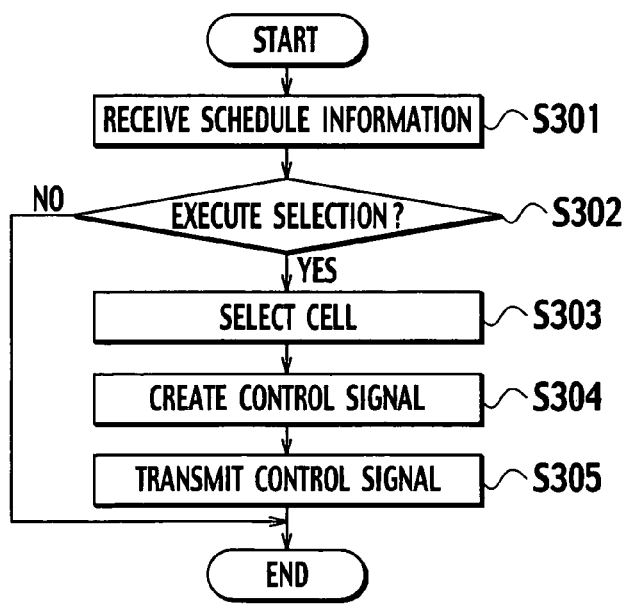
FIG. 12 is a flowchart showing the procedures of a mobile communication method according to the third embodiment of the present invention.

Next, a mobile communication method using the radio controller 230 shown in FIG. 10 will be described. FIG. 12 shows the operational procedures of the radio controller 230. In Step 301, the radio controller 230 receives the schedule information of the data transmission from a content server 50, for example. In Step 302, the radio controller 230 determines, based on the received schedule information, whether or not to select a cell used by the mobile station 10 after the data reception.

Following this, in Step S303, the radio controller 230 selects a cell to cause the mobile station 10 to use after the data reception, when it is determined to execute the selection. In Step S304, the radio controller 230 creates the control signal including the selected cell information. In Step S305, the radio controller 230 transmits the created control signal to the mobile station 10 through the base station 20. On the other hand, when it is determined not to execute the selection in Step S302, the radio controller 230 terminates the process without executing the cell selection.

(Effects)

According to the radio controller 230, and the mobile communication system 100 and the mobile communication method using the radio controller 230, the radio controller 230 determines whether or not to select a cell that the mobile station 10 is caused to use after the data reception in consideration of the schedule information. It is possible to select a cell that the mobile station 10 is caused to use after the data reception only when the selection should be executed. Then, the radio controller 230 can cause the mobile station 10 to use the selected cell. Hence, the radio controller 230 can prevent the wasteful cell selection from being executed, thus making it possible to prevent the mobile station 10 from changing the cells wastefully. Accordingly, the radio controller 230 can distribute the mobile stations 10 into the plurality of cells after the data reception, can prevent traffic concentration, and can utilize the radio resources effectively.

Furthermore, the radio controller 230 can reduce the power consumption of the mobile station. Additionally, it is possible to obtain an effect that the radio controller 230 can prevent the cell selection from being executed, when there is a potential affection to the reception of the data which is transmitted next due to the selection of the next cell.

Variants

It is to be understood that the present invention is not intended to be limited to the above-mentioned embodiments, and various changes may be made therein. In FIG. 8, the content server 50 includes the schedule information manager 51, the selection execution determiner 52 and the selection execution commander 53. However, it is possible to share these functions between the content server 50 and a management server provided in the core network 40. That is, the content server 50 may function as a server including the schedule information manager 51, the selection execution determiner 52 and the selection execution commander 53 by cooperation with the management server. For example, the content server 50 may include the schedule information manager 51, and the management server may include the selection execution determiner 52 and the selection execution commander 53. Otherwise, a management server including the schedule information manager 51, the selection execution determiner 52 and the selection execution commander 53 may be provided in the core network 40.

Moreover, the schedule information manager 51 of the content server 50 or the management server may set a threshold value of a transmission interval used for determining whether or not to execute the cell selection, and may notify it to the radio controllers 30 or 230.

What is claimed is:

1. A radio controller comprising:
   a schedule information receiver configured to receive schedule information which shows a time interval of data transmission;

a selection execution determiner configured to determine, based on the schedule information, whether or not to cause a mobile station to select a cell which is used by the mobile station after reception of a scheduled data transmission; and a selection execution commander configured to command the mobile station to select the cell which is used by the mobile station after the data reception in accordance with a determination result by the selection execution determiner.

2. The radio controller of claim 1, wherein the selection execution determiner determines not to execute the cell selection when the time interval of the data transmission is shorter than a threshold value.

3. The radio controller of claim 1, wherein the schedule information is schedule information of the data transmission performed by at least one of broadcast, multicast and High Speed Downlink Packet Access.

4. A radio controller comprising:
   a schedule information receiver configured to receive schedule information which shows a time interval of data transmission;
   a selection execution determiner configured to determine, based on the schedule information, whether or not to cause a mobile station to select a cell which is used by the mobile station after reception of a scheduled data transmission;
   a cell selector configured to select the cell in accordance with a determination result by the selection execution determiner; and
   a mobile station controller configured to control the mobile station in a manner of performing radio communication using the cell selected by the cell selector.

5. The radio controller of claim 4, wherein the selection execution determiner determines not to execute the cell selection when the time interval of the data transmission is shorter than a threshold value.

6. The radio controller of claim 4, wherein the schedule information is schedule information of the data transmission performed by at least one of broadcast, multicast and High Speed Downlink Packet Access.

7. A server comprising:
   a schedule information manager configured to determine schedule information which shows a time interval of data transmission;
   a selection execution determiner configured to determine, based on the schedule information, whether or not to cause a mobile station to select a cell which is used by the mobile station after reception of a scheduled data transmission; and
   a selection execution commander configured to command a radio controller or the mobile station to select the cell which is used by the mobile station after the data reception in accordance with a determination result by the selection execution determiner.

8. The server of claim 7, wherein the selection execution determiner determines not to execute the cell selection when the time interval of the data transmission is shorter than a threshold value.

9. The server of claim 7, wherein the schedule information is schedule information of the data transmission performed by at least one of broadcast, multicast and High Speed Downlink Packet Access.

10. The server of claim 7, wherein the schedule information manager determines new schedule information based on a record of the schedule information.

11. A mobile communication method performed by a radio controller comprising the steps of:
    receiving, by a schedule information receiver of the radio controller, schedule information which shows a time interval of data transmission;
    determining, by a selection execution determiner of the radio controller, based on the schedule information, whether or not to cause a mobile station to select a cell which is used by the mobile station after reception of a scheduled data transmission; and
    commanding, by a selection execution commander of the radio controller, the mobile station to select the cell which is used by the mobile station after the data reception in accordance with a determination result in the determining step.

12. A mobile communication method comprising the steps of:
    receiving schedule information which shows a time interval of data transmission;
    determining, based on the schedule information, whether or not to cause a mobile station to select a cell which is used by the mobile station after reception of a scheduled data transmission;
    selecting the cell in accordance with a determination result in the determining step; and
    controlling the mobile station in a manner of performing radio communication using the selected cell.

13. A mobile communication method performed by a server comprising the steps of:
    retrieving, by a schedule information manager of the server, schedule information which shows a time interval of data transmission;
    determining, by a selection execution determiner of the server, based on the schedule information, whether or not to select a cell which is used by a mobile station after reception of a scheduled data transmission;
    commanding, by a selection execution commander of the server, a radio controller or the mobile station to select the cell which is used by the mobile station after data reception in accordance with a determination result in the determining step.

* * * * *